Nov. 3, 1925.  1,559,728
N. MILLER
RANGE FINDING DEVICE
Filed Nov. 21, 1921   2 Sheets-Sheet 1
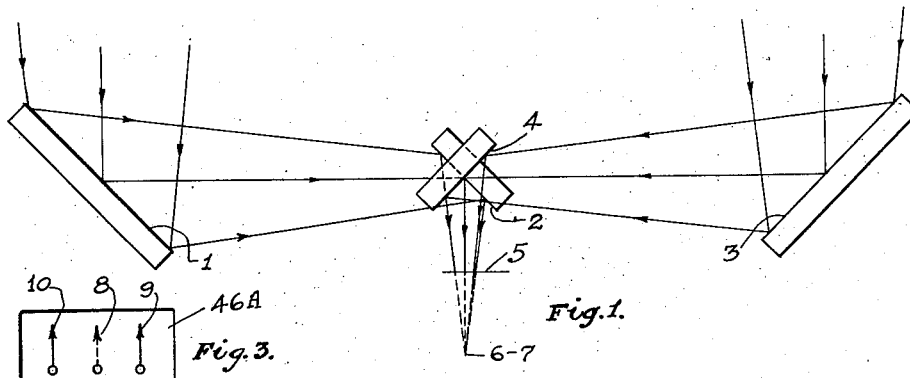
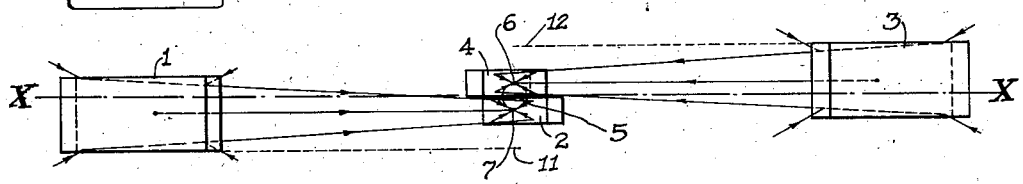
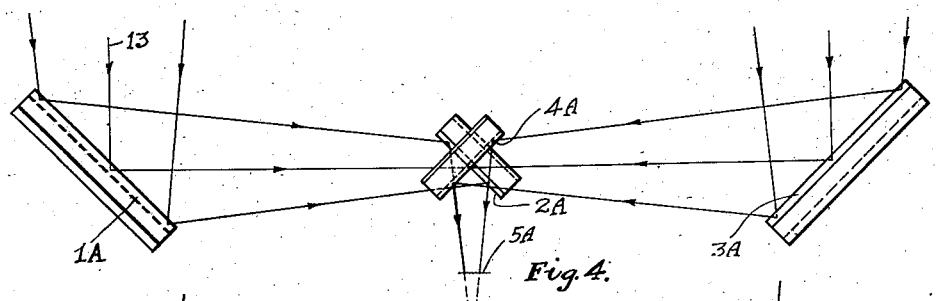
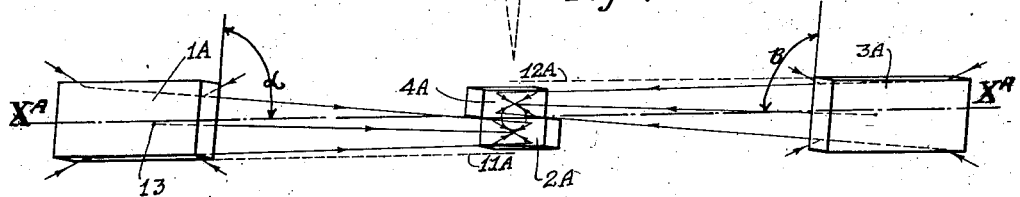
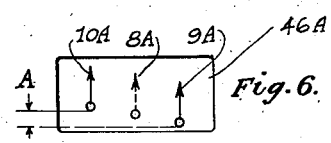
Inventor
Nicholas Miller Nov. 3, 1925.   1,559,728
N. MILLER
RANGE FINDING DEVICE
Filed Nov. 21, 1921   2 Sheets-Sheet 2

Inventor
Nicholas Miller

Patented Nov. 3, 1925.

1,559,728

UNITED STATES PATENT OFFICE.

NICHOLAS MILLER, OF HARTFORD, CONNECTICUT.

RANGE-FINDING DEVICE.

Application filed November 21, 1921. Serial No. 516,755.

*To all whom it may concern:*

Be it known that I, NICHOLAS MILLER, a citizen of the United States of America, and a resident of Hartford, county of Hartford, and State of Connecticut, have invented certain new and useful Improvements in a Range-Finding Device, of which the following is a specification.

The object of the present invention is to produce a range finder of simple and inexpensive construction, of compact design, and one which will measure comparatively short distances accurately: I have discovered that the height of an instrument of this kind can be considerably reduced by tilting the co-operating pairs of reflectors at an angle greater or less than 90° with respect to an imaginary plane of symmetry or with respect to an imaginary plane parallel to the base of the instrument and along the line of vision, and this is accomplished without affecting the efficiency of the instrument as will hereinafter be described. Further objects of the invention are to provide an instrument of this kind with a series of independent adjustments, whereby the instrument can be calibrated to precisely correspond to three different readings on a scale of distances. An instrument of this kind must be held approximately level in one direction if reliable readings are to be taken and in the present invention a gravity controlled shutter is provided which automatically shuts off or mutilates the images of an object if not held at the proper level. Other useful objects of the invention reside in the peculiar combination and arrangement of the component parts, hereinafter to be described, illustrated and claimed:—

In the accompanying illustrations Fig. 1 represents the usual arrangement of reflectors in this type of instrument.

Fig. 2 is a side view of Fig. 1.

Fig. 3 illustrates the relative positions of an object and its images produced by the reflectors represented in Figs. 1 and 2.

Fig. 4 diagrammatically illustrates the arrangements of reflectors pertaining to this invention.

Fig. 5 is a side view of Fig. 4.

Fig. 6 illustrates the relative position of an object and its images produced by the reflectors represented in Figs. 4 and 5.

Figure 7:
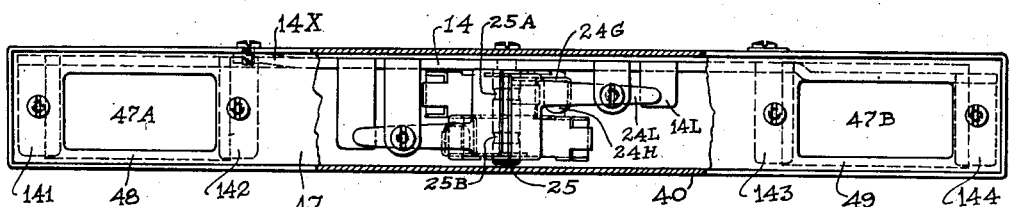

Fig. 7 represents a front view of the instrument with part of the casing cut away to show part of the interior structure.

Figure 8:
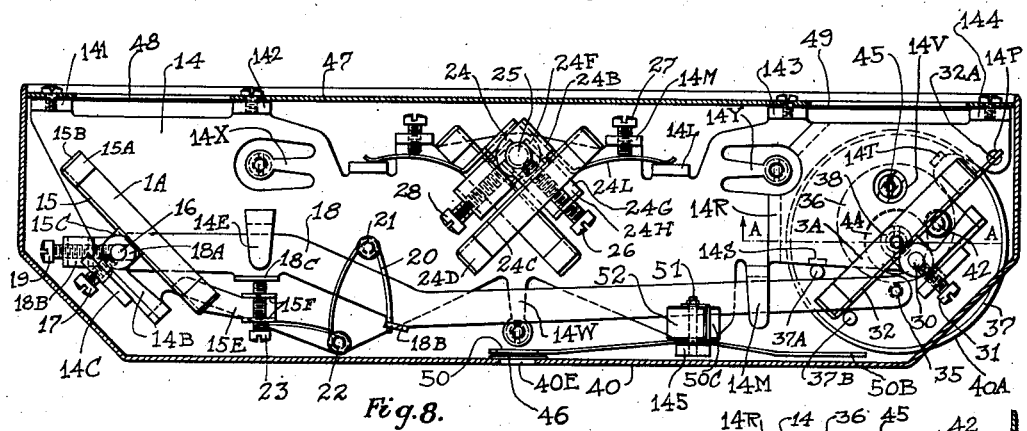

Fig. 8 is a top view with the casing in section.

Figures 9, 10:
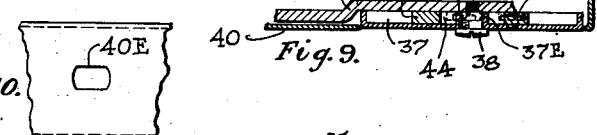

Fig. 9 is a partial sectional view on line "A—A" Fig. 8.

Fig. 10 is a partial rear view of the casing showing the opening for the eye.

Figure 11:
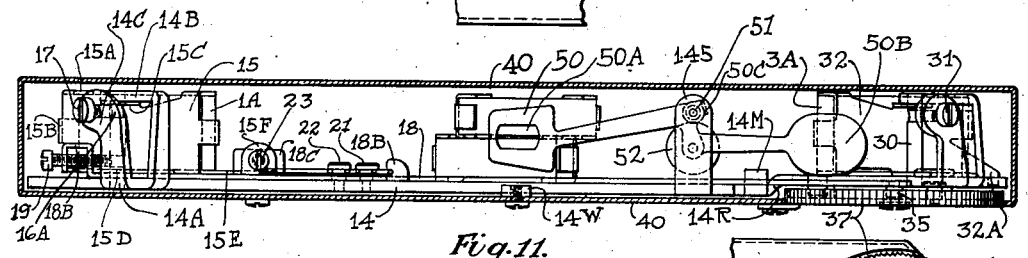

Fig. 11 is a rear view of Fig. 8 with the casing in section.

Figure 12:
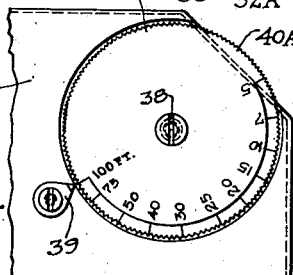

Fig. 12 is a partial bottom view of Fig. 11 showing the scale of distances.

Figure 13:
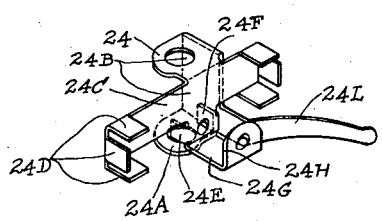

Fig. 13 is an isometric view of one of the center reflector holders.

The present invention belongs to that class of apparatus in which two simultaneous images of an object are formed by two pairs of reflectors and where one of the reflectors is rotated about a pivot for causing the registering of the two images for objects at various distances.

This invention is intended primarily for measuring comparatively short distances say 5 ft. to 200 ft., such as would be useful in photography in connection with focusing; also for quickly and conveniently measuring distances which are ordinarily measured with the repeated application of a ruler or tape. For such purposes it is not necessary to provide objectives and eye pieces though these may be applied to the present invention. As usually arranged in instruments of this type, the reflector planes are all parallel, and the size of the pairs of reflectors is governed by their marginal rays of the field of view converging to the observer's eye. This is diagrammatically illustrated in Figs. 1 and 2. In Fig. 1 (for reasons of simplicity the reflection is shown as occurring on the front surface of the mirrors), each pair of reflectors 1—2 and 3—4 reflects an independent set of rays converging to apexes 6 and 7 and intercepted by the eye at 5. With this arrangement each pair of reflectors will form a virtual image of an object on the same level but displaced in a horizontal plane. In Fig. 3, if 8 represents an object viewed by such an arrangement of reflectors, then 9 represents the image formed by reflectors 1 and 2 and 10 the image formed by reflectors 3 and 4. By rotating reflector 1 about a pivot, image 9 may be caused to move in line with image 10 and the extent of this rotation indicates the distance of the object. The reflectors are preferably symmetrically arranged with respect to an imaginary plane "XX' (Fig. 2) passing between reflectors 2 and 4. As usually arranged all the reflectors are perpendicular to this imaginary surface and the central or median lines of the two pairs of reflectors 1—2 and 3—4 are parallel to and an equal distance above and below this plane. From this it will appear that the height of the instrument is determined by the bottom line and top line of reflectors 1 and 3 respectively and indicated by dotted lines 11 and 12. As this device is to be carried in the pocket it is of great advantage to have it as compact as possible. I have discovered that the height of the instrument can be considerably reduced without affecting its efficiency. In order to accomplish this result, the reflection of the rays from the two pairs of reflectors should substantially be the same as that explained in connection with Figs. 1 and 2, and the two images should be parallel to one another in order that their alignment be readily determined. In Fig. 5 "XA—XA" represents an imaginary plane of symmetry between reflectors $2^A$ and $4^A$ and the median lines of reflectors $1^A$ and $3^A$ are coincident with this plane, while the median lines of reflectors $2^A$ and $4^A$ are below and above it. Now if reflector $1^A$ is tilted with respect to this imaginary plane in such a way that a ray from an object incident upon its median line shall be reflected to the median line of its cooperating reflector $2^A$, then reflector $2^A$ will reflect substantially all of the rays incident upon reflector $1^A$, but such rays will not converge to the eye of the observer at $5^A$ as was in the case of Figs. 1 and 2, and the two reflectors $1^A$ and $3^A$ will not produce parallel images of an object. If however, reflectors $2^A$ and $4^A$ are tilted parallel to reflectors $1^A$ and $3^A$ the incident rays upon reflector $1^A$ will be parallel to the reflected rays from $2^A$ or substantially the same as in the case of reflectors 1 and 2 in Figs. 1 and 2. In Fig. 6 if $8^A$ represents an object, $9^A$ and $10^A$ will represent the images formed by the pairs of reflectors $1^A$—$2^A$ and $3^A$—$4^A$ respectively. These images will be parallel but vertically displaced by a constant distance "A" which depends on the inclination of the pairs of reflectors $1^A$—$2^A$ and $3^A$—$4^A$. From experiments I have found that this displacement (which is always slight) facilitates the alignment of the images, for since corresponding points of the images do not exactly coincide, a slight displacement of such points is more readily detected than if they overlapped, when such displacements are apparent only from the blurring or indistinctness of the combined images.

Referring to Figs. 7, 8, 9 and 11, 14 represents a base or frame formed out of one piece of sheet metal, and it serves as a support for the various reflectors and their adjustments. In these figures the reflectors are not shown tilted as in diagrammatic Figs. 4 and 5, in order that the important structural features may not be obscured by the many close lines that such illustration would require.

Reflector $1^A$ is cemented into a holder 15 which is preferably made from resilient material and provided with suitable lugs $15^A$, $15^B$, etc. for supporting reflector $1^A$ on the sides. On the rear of the holder are two lugs $15^C$ and $15^D$ formed at right angles, and perforated to pivot upon a stud 16 which is held in a perforation on the base at $14^A$ (Fig. 11) and at its upper end by a slender arm $14^B$, formed out of the material of the base in the form of an inverted L, and this arm $14^B$ is sufficiently resilient to yieldingly support stud 16 at its upper end. Another bent lug $14^C$ is provided with an adjusting screw 17, by which pressure may be exerted upon stud 16 near its upper end, and thereby the reflector $1^A$ adjustably tilted. The stud 16 is provided with a groove $16^A$ at the point where it comes in contact with the screw 17 and this serves to retain pin 16 in its position. The reflector $1^A$ is rotated about its pivot through a lever 18 which is in contact with the bottom of the frame 14 and extends underneath the reflector holder 15, and there it is provided with a slot $18^A$ which engages pin 16. One end of lever 18 has an inverted U formation $18^B$ which is provided with an adjusting screw 19 in the direction of the slot $18^A$ and in contact with pin 16. One end of a spring 20 anchored at 21 and 22 on base 14, exerts a force upon a lug $18^D$ of lever 18, pulling the adjusting screw 19 against the pin 16, and thereby the lever 18 can be longitudinally adjusted for purposes hereinafter to be described. Reflector holder 15 is provided with an extension $15^E$ on which are formed two opposite lugs $15^F$ for receiving and adjusting screw 23 and opposite a lug $18^C$. One end of spring 20 forces adjusting screw 23 against lug $18^C$ of arm 18. From the foregoing it will appear that the reflector $1^A$ is adjustable relative to the arm 18 by screw 23 about their common pivot 16. A lip $14^E$ is sheared out of base 14 to guide lever 18 in contact with it.

The center reflectors $2^A$ and $4^A$ are supported by identical holders made of resilient material and of such construction that the reflector planes have adjustment in any plane without any separate spring devices. As shown in Fig. 13 this reflector holder is formed out of one piece of sheet metal, of which 24 and $24^A$ represent two parallel surfaces being parts of a U formation on the body part $24^B$ of the holder. The holder is provided with holes on the portions 24 and $24^A$ whereby it is supported in stud 25. (Figs. 7 and 8.) On the upper part of 24 the reflector supporting part $24^C$ is bent downward at nearly right angles and provided with the reflector holding lips $24^D$, and on the lower part of $24^C$ two opposite lips $24^E$ and $24^F$ are bent toward the hole in $24^A$ and the space between said lips is just wide enough to receive stud 25 (Figs. 7 and 8), their purpose being to guide the reflector supporting part $24^B$ about the supporting stud 25. Directly under the lips $24^E$ and $24^F$ a strip of the metal $24^G$ is bent at right angles outward and bent again upward as shown at $24^H$ and this is provided with a threaded hole and also the portion opposite it between lips $24^E$ and $24^F$, in order to receive an adjusting screw 26 which exerts pressure directly against stud 25 Figs. 7 and 8. Thus due to the resilience of the material, the inclination of the center reflectors relative to the supporting stud can be adjusted by screws in the free end of the extensions which support the reflectors; by the aid of this adjustment the reflectors $2^A$ and $4^A$ can be adjusted parallel to reflectors $1^A$ and $3^A$ respectively as explained in connection with Figs. 4 and 5. Portion $24^B$ (Fig. 13) of the reflector holder is further provided with a resilient projection $24^L$ which contacts with lug $14^L$ (Figs. 7 and 8) and is acted upon by adjusting screws 27 on lug $14^M$. By this means the reflectors $2^A$ and $4^A$ are rotatably adjusted about stud 25. As will be seen in Figs. 7 and 8 the two reflector holders for the reflectors $2^A$ and $4^A$ are identical but they are reversed and assembled on stud 25 simultaneously, and retained upon the stud by the adjusting screws 26 and 28 contacting with grooves $25^A$ and $25^B$ upon stud 25. Reflector $3^A$ Figs. 8 and 11 is supported on a pin 30 and its inclination is adjusted by a screw 31 in a manner similar to reflector $1^A$, but in this case the reflector holder is not rocked about the pin 30, it simply serves as an anchor and adjusting means. An extension $32^A$ of the reflector holder 32 fits into a slotted opening $14^P$ on base 14 and prevents the reflector from turning on the pin 30.

Lever 18 rocks about pivot 16, as has been explained, and said lever is provided with a pin 35 which cooperates with a cam disc 36 Figs. 8 and 9, through the action of spring 20 which not only holds the lever 18 in contact with screw 23 but also holds pin 35 in contact with the cam disc 36. This cam disc is fastened to a disc 37 (Figs. 8, 9, 11 and 12) which is pivotally supported by a screw 38 on the base 14, a portion of the base being offset as shown at $14^R$ Figs. 9 and 11, in order that the outside face of this disc shall be in level with the lower side of case 40 which is cut out to clear it as shown in Figs. 9, 11 and 12. The outside face of this disc is graduated with the distances which are referred to a pointer 39 fastened to the case. The outside edge or rim of the disc 37 is knurled Fig. 12 and it overlaps the case at $40^A$ Figs. 8 and 12, where it can be conveniently rotated with the fingers. Two stop pins $37^A$ and $37^B$ on disc 37 limit the rotation of said disc against lugs $14^S$ and $14^T$ on base 14. It will appear from the foregoing that this arrangement of the scale device results in a very compact instrument with almost no obstruction protruding from the casing. The unavoidable inaccuracy and lack of precise uniformity of the component parts makes it necessary to adjust and calibrate each instrument and therefore in order to accurately adjust the reading on the scale disc 37 to the actual distance of objects corresponding to said reading, certain adjustments are desirable between the pivoted reflector $1^A$ and the scale disc 37. It can be shown that by adjusting the "throw" of disc cam 36 to impart more or less angular movement to lever 18 through pin 35, and by adjusting the reflector $1^A$ relative to lever 18, the readings on the scale disc 37 can be adjusted to correspond accurately to objects at two different distances. By providing another independent adjustment, namely by longitudinally adjusting lever 18 relative to pivot 16 in a manner previously explained—whereby the length of the lever relative to the cam disc 36 is varied, it is possible to adjust the scale on disc 37 to accurately correspond to another and different distance. Thus by the independent adjustments of the cam disc 36 and lever 18 the distance scale can be made to accurately correspond to three different distances, and when this is the case the scale reading will correspond to intermediate distances with sufficient precision for all practical purposes.

In Figs. 8 and 9 the cam disc 36 is counterbored and pivotally held by a stud 42 which rivets into disc 37, and the cam disc 36 is provided with a round opening 44 so that it may clear the bearing projection $37^E$ of disc 37. Thus the cam disc 36 can be moved about its pivot 42 and clamped in its adjusted position by screw 45 which fits into counterbored and slotted depression in said cam disc. The base 14 is provided with a hole $14^V$ so that the screw 45 is accessible from the top of the instrument. $14^M$ is a projection to guide lever 18 in contact with base 14. The device is assembled upon the base 14, adjusted and calibrated, then put into the casing and fastened to base 14. The casing 40 consists of a narrow trough like compartment preferably made out of one piece of sheet metal, provided with an opening on the bottom side for scale disc 37 as has been explained. The casing is fastened to the base 14 by three screws through the resilient projections $14^W$ $14^X$ and $14^Y$, which are slightly offset as shown at $14^X$ Fig. 7 in order to separate slightly the body of the base 14 from the inside surface of the casing. The purpose of this arrangement is to prevent the warping of the base 14 when it is fastened to the casing, which might effect the various adjustments and thus destroy the precision of the instrument. Opposite the center reflectors the case is provided with an opening 40$^E$ Figs. 8 and 10 for viewing the images of an object. On the inside of this opening a piece of celluloid A$^6$ or other transparent material is cemented to exclude dust or dirt from the instrument. Over the front opening of the casing a strip 47 is fastened with screws to the four lugs 141, 142, 143 and 144 of base 14 and said strip is provided with two openings 47$^A$ and 47$^B$ through which light rays from an object pass to the reflectors 1$^A$ and 3$^A$. These openings are covered with pieces of celluloid 48 and 49, or other transparent material. In use the apparatus is held in the hand in a substantially horizontal position and images of an object are viewed with one eye through opening 40$^E$. When the scale disc 37 is manipulated with one of the fingers, the right hand image 9$^A$, Fig. 6 can be made to align with the lefthand image 10$^A$, in a vertical line and the scale then will indicate the distance of the object. Theoretically when sighting the instrument it should be held so that an imaginary line from the observer's eye to the object shall pass through the center of the opening 40$^E$ and centrally between the two center reflectors, further, the instrument should be longitudinally in a fixed direction preferably in a horizontal position. From experiments I have found that a moderate displacement of the instrument from the imaginary line above described does not materially affect the relative position of the two images and hence the reading of the distance, provided the instrument is held longitudinally in a fixed direction, preferably in a horizontal position. In order to insure or to compel the use of the instrument longitudinally in a fixed direction, a shutter 50 is pivotally supported upon a lug 145 at 51 and said shutter is provided with an opening 51$^A$ Figs. 8 and 11, opposite opening 40$^E$ in casing 40. Shutter 50 has a counterbalancing extension 50$^B$ on the other side of the pivot 51. An extension on the shutter is bent at right angles and parallel to the pivot at 50$^C$ and a lip on this extension bent again toward the pivot to provide bearing for the shutter and to support a weight 52 underneath the pivot. If the instrument is held in a horizontal position, shutter opening 50$^A$ will be opposite opening 40$^E$ in the casing, but if the instrument is longitudinally tilted out of a horizontal position the shutter opening will move out of alignment with opening 40$^E$ due to the action of gravity on weight 52, and thus shut off one or both of the images depending upon the extent of the inclination of the instrument from the horizontal position. Thus in use the instrument is automatically leveled.

Having thus described my invention, what I claim as new, and desire to secure by Letters Patent is:

1. In combination with a range finder, a base, two pairs of cooperating reflectors, disposed in such a way, that the median lines of the reflectors of either pair are at an uneven level with respect to the plane of the base; means for tilting the cooperating reflectors of each pair at the same angle of inclination with respect to said plane, and means for rocking one of the reflectors about a fixed axis.

2. In a range finder, two pairs of cooperating reflectors arranged symmetrically with respect to a plane XA—XA along the line of vision, and such that a median line of one of the reflectors of each pair substantially coincides with said plane, while the median lines of their cooperating reflectors are one above and the other below this plane: means for equally inclining each pair of reflectors with respect to said plane, and provision for adjusting the angle of inclination of the reflectors.

3. In a range finding device, a base, a pin, a resilient projection integral with the base for yieldingly supporting said pin at one end; a reflector, a holder for said reflector, means for supporting the reflector holder upon said pin, and a screw for exerting pressure upon said pin for adjusting the inclination of the reflector.

4. In a range finding device, a base, a resilient projection on said base, a pin yieldingly supported at one end by the resilient projection; a reflector, a holder for said reflector, means for pivotally supporting the holder on said pin, means for adjusting the yielding end of said pin and thereby the inclination of the reflector and means for preventing the turning of the reflector about said pin.

5. In a range finding device, a base, a stud integral with said base, a reflector, a holder comprising means for pivotally engaging said stud, and a resilient extension adapted to support the reflector inclined to the plane of the base, said extension being free on one end; a screw cooperating with the stud and the free end of the reflector holder for adjusting said inclination of the reflector, substantially as described.

6. In a range finding device, a base, a stud integral with said base, a reflector, a reflector holder comprising means for pivotally engaging said stud and for supporting the reflector in an inclined position relative to the plane of the base and means for adjusting the inclined position of said reflector; a resilient projection integral with said reflector holder, a lug upon said base contacting with said resilient projection, and a screw cooperating with said resilient projection for adjusting the reflector holder about the axis of said stud.

7. In a range finding device, two pairs of cooperating reflectors, having one of the reflectors of one pair positioned above the corresponding reflector of the other pair; a base, a stud integral with said base, a reflector holder adapted to support either one of the last mentioned reflectors and comprising means whereby two of said holders may engage said stud simultaneously; means for adjusting the reflector holders about the axis of said stud, and provision for retaining the holders on said stud.

8. In a range finding device, a base, a reflector holder, means for pivotally supporting the reflector holder upon said base; a lever arm loosely connected to said holder, a spring tending to force the holder against the lever arm and a screw adapted to separate the holder from said lever arm.

9. In a range finding device, a base, a reflector holder, means for pivotally supporting the reflector holder upon said base; a lever arm adjustably connected to the reflector holder; a disc rotatably mounted upon the base, a cam element cooperating with said lever arm and pivotally connected to said disc; means for adjusting the position of the cam upon said disc for varying the movement of said lever arm, and provision for adjusting the reflector holder relative to said lever arm.

10. In a range finding device, a base, a reflector holder, means for pivotally supporting the reflector holder upon said base; a lever arm, a slot connection between the reflector holder and the lever arm, a screw cooperating with said slot connection for varying the length of said lever arm; a spring tending to hold the lever arm in a fixed relation with the reflector holder, and a cam element cooperating with said lever arm.

11. In a range finding device, a base, a reflector holder, means for pivotally mounting the reflector holder upon said base; a lever arm comprising a slot for slidingly engaging the pivot of the reflector holder, a screw for adjusting the position of the lever arm relative to said pivot, another screw for adjusting the angular relation between the reflector holder and said lever arm, and means for imparting a rocking movement to said lever arm.

12. In a range finding device, a base, two pairs of reflectors for forming two virtual images of an object; a reflector holder pivotally mounted upon said base; a lever arm, connection between the lever arm and the reflector holder comprising a screw for adjusting the angular relation between the reflector holder and the lever arm; a disc rotatably mounted upon an axis and adapted to be manipulated by the fingers, a cam element attached to said disc and cooperating with said lever arm for causing one of the images to move into alignment with the other image; a predetermined scale of distances, means for indicating distances on the scale by rotation of said disc and means for adjusting the cam upon said disc whereby the alignment of the images of an object at two different distances may be made to coincide with the corresponding indications on said scale.

13. In a range finding device, a base, two sets of cooperating reflectors for forming two virtual images of an object, a reflector holder pivotally mounted upon said base; a lever arm connected to the reflector holder; a disc supported on the base for manual rotation, a cam element attached to said disc and adapted to rock said lever arm to cause one of the virtual images to move into alignment with the other virtual image; a predetermined scale of distances, and means for indicating the distances by said disc. Provision for making three independent adjustments, whereby the alignment of the virtual images of an object at three different distances may be made to coincide with the corresponding indications on said scale; said adjustments comprising means for adjusting the position of the cam on said disc for varying the movement of said lever, means for altering the angular relation between the reflector holder and the lever arm, and another adjustment for varying the length of the lever arm.

14. In a range finding device, a base, a reflector holder pivotally mounted upon said base, a lever arm connected to said reflector holder, a disc mounted for rotation on a holder, a disc mounted for rotation on a fixed axis which is substantially parallel to the axis of said lever arm, and the face of said disc being parallel to the plane of the base; a cam secured to said disc and cooperating with said lever arm; a casing for said device having a partial circular opening to receive said disc, the face of said disc being substantially level with a surface of said casing and an overlapping segmental portion of said disc adapted to be manipulated by the fingers.

15. In a range finding device, two pairs of cooperating reflectors, means for simultaneously viewing two virtual images of an object produced by said reflectors; a shutter pivotally supported on a fixed axis and comprising a blade oscillating in the line of vision; a weight element connected to said shutter for causing the blade to mutilate one or both of said images if the instrument is not held at the proper level.

NICHOLAS MILLER.